(12) United States Patent  (10) Patent No.: US 8,363,173 B2
Chang et al.  (45) Date of Patent: Jan. 29, 2013

(54) OPTICAL TOUCH SCREEN DEVICE AND RELATED HAND-WRITING SYSTEM

(75) Inventors: Tsung-Heng Chang, Taipei Hsien (TW); Chi-Wei Chiu, Taipei Hsien (TW); Chun-Cheng Ko, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 342 days.

(21) Appl. No.: 12/693,499

(22) Filed: Jan. 26, 2010

(65) Prior Publication Data

US 2011/0013104 A1    Jan. 20, 2011

(30) Foreign Application Priority Data

Jul. 17, 2009 (CN) .......................... 2009 1 0304457

(51) Int. Cl.
*G02F 1/1335* (2006.01)
(52) U.S. Cl. .......................... 349/12; 349/120; 349/175
(58) Field of Classification Search .................. None
See application file for complete search history.

(56) References Cited

U.S. PATENT DOCUMENTS

2003/0053020 A1* 3/2003 Okada et al. .................. 349/139
2004/0246434 A1* 12/2004 Ohashi et al. ................. 349/199

* cited by examiner

*Primary Examiner* — Lucy Chien
(74) *Attorney, Agent, or Firm* — Altis Law Group, Inc.

(57) ABSTRACT

An optical touch screen device includes a light output panel, a first polarizer, a first light-pervious plate, a liquid crystal layer and an image capture module. The light output panel includes a first surface for outputting light rays. The first polarizer is stacked on the first surface. The first light-pervious plate is arranged facing the first polarizer. The liquid crystal layer is arranged between the first polarizer and the first light-pervious plate. The liquid crystal layer includes a plurality of liquid crystal molecules aligned in predetermined orientations. The image capture module has a viewing field covering an entire surface of the first light-pervious plate. The image capture module includes a second polarizer. The second polarizer has a polarization axis associated thereof. The liquid crystal layer is configured for causing light transmitting therethrough to have a polarization direction perpendicular to the second polarization axis.

16 Claims, 9 Drawing Sheets

OPTICAL TOUCH SCREEN DEVICE AND RELATED HAND-WRITING SYSTEM

BACKGROUND

1. Technical Field

The present disclosure relates to an optical touch screen device and a related hand-writing system.

2. Description of Related Art

A touch panel incorporated into a thin film transistor (TFT) liquid crystal display (LCD) has been proposed. A typical LCD includes a pair of glass plates which are separated by a layer of liquid crystal material. Commonly, the touch panel can be selected from a resistive touch panel and a capacitive touch panel.

In the above described LCD, the touch panel is usually attached to a display screen of the LCD. A number of resistors or capacitors are installed in the touch panel and are arranged in an array. When a stylus touches the touch panel, resistances/capacitances of some resistors/capacitors are changed. Thus, a position of the stylus on the written panel is sensed according to the change of the resistances/capacitances of the resistors/capacitors. However, the resistances/capacitances cause the touch panel to have a complex manufacture procedure. This increases cost and reduces production efficiency.

Therefore, an optical touch screen device and a hand-writing system which can overcome the above mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
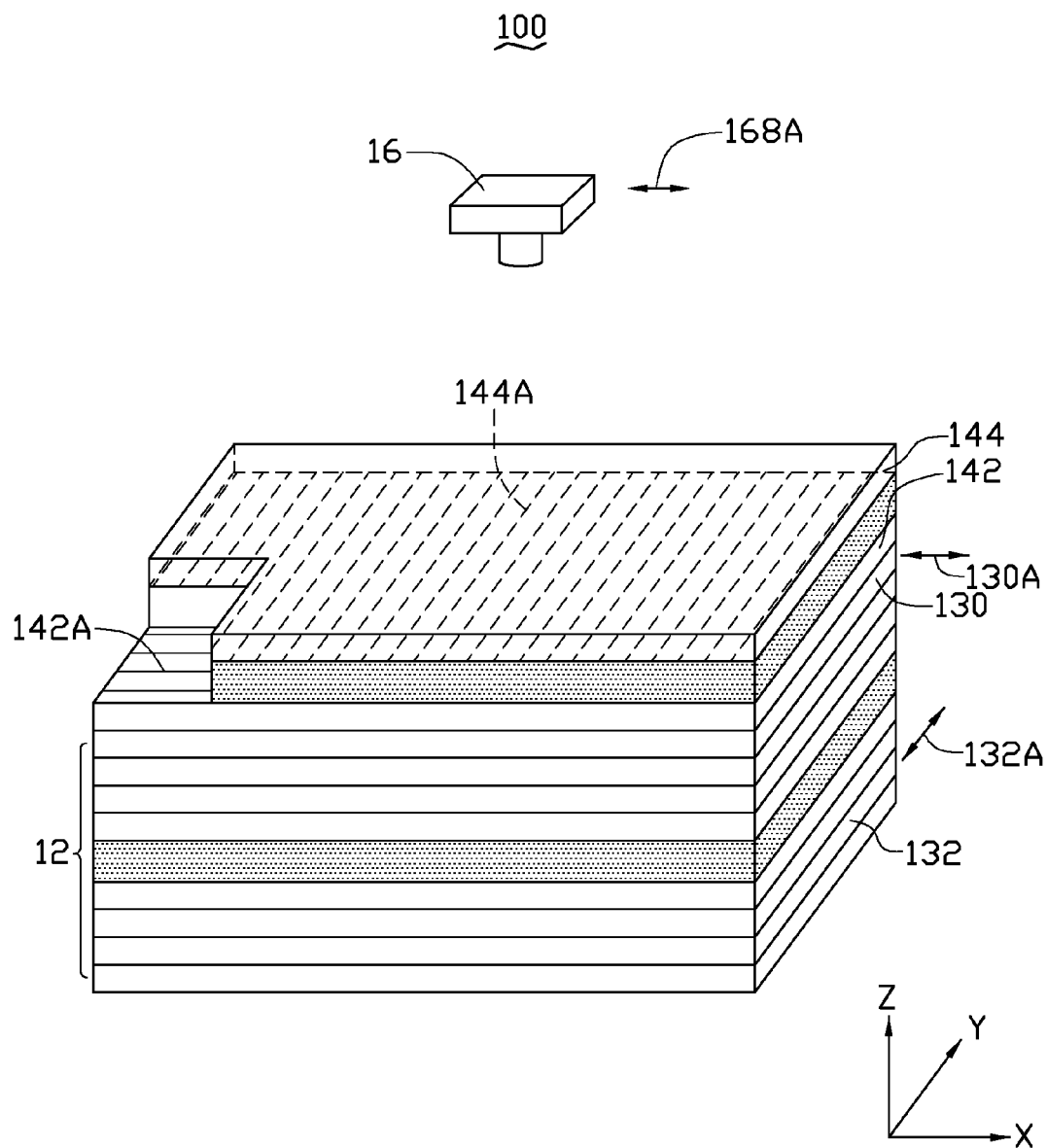
FIG. 1 is a partially cross-sectional view of an optical touch screen device in accordance with a first exemplary embodiment.
Figure 2:
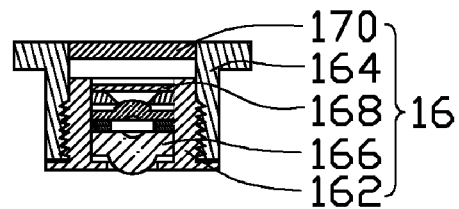
FIG. 2 is a cross-sectional view of the optical touch screen device of FIG. 1.
Figure 2:
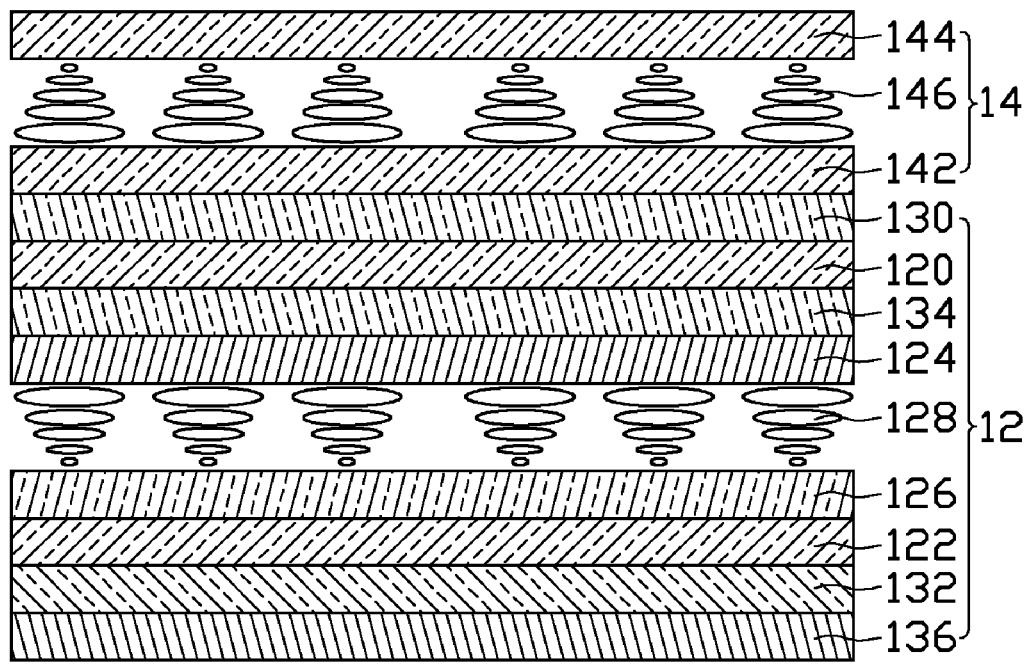

Referring to FIGS. 1 and 2, an optical touch screen device 100 in accordance with a first exemplary embodiment includes a display panel 12, a liquid crystal cell 14, and an image capture module 16.

In this embodiment, the display panel 12 is a liquid crystal display panel. The display panel 12 includes a first light-pervious plate 120, a second light-pervious plate 122, a first electrode layer 124, a second electrode layer 126, and a liquid crystal layer 128. The first and second electrode layers 124 and 126 are positioned between the first and second light-pervious plates 120 and 122. The first electrode layer 124 is arranged adjacent to the first light-pervious plate 120. The second electrode layer 126 is stacked on the second light-pervious plate 122. The liquid crystal layer 128 is sandwiched between the first and second electrode layers 124 and 126. In this embodiment, the liquid crystal layer 128 is a twisted-nematic-type (TN-type) liquid crystal layer.

The display panel 12 further includes a first linear-type polarizer 130, a second linear-type polarizer 132, a color filter 134, and a backlight module 136. The color filter 134 is sandwiched between the first electrode layer 124 and the first light-pervious plate layer 120. The color filter 134 is configured for providing various colors for displayed content of the display panel 12.

The first polarizer 130 is stacked on a surface of the light-pervious plate 120 facing away from the color filter 134. The first polarizer 130 has a polarization axis 130A associated therewith parallel with an X axis of an X-Y-Z coordinate system as shown in FIG. 1. The second polarizer 132 and the backlight module 136 are stacked on a surface of the second light-pervious plate 122 in the described order facing away from the second electrode layer 126. The second polarizer 132 has a polarization axis 132A associated therewith parallel with the Y axis of the X-Y-Z coordinate system. That is, the polarization axis 130A of the first polarizer 130 intersects at a right angle with the polarization axis 132A of the second polarizer 132. In an alternative embodiment, the first polarization axis 130A can also be parallel with the second polarization axis 132A. The backlight module 136 is configured for providing illumination to the display panel 12.

In an alternative embodiment, the liquid crystal layer 128 can also be a Super-TN-type (STN-type) liquid crystal layer. As described above, the display panel 12 is a common transmission type display. Alternatively, the display panel 12 can also be a common reflection type display or a common transflective type display.

The first liquid crystal cell 14 is formed on a surface of the first polarizer 130 facing away from the first light-pervious plate 120. The first liquid crystal cell 14 includes a third light-pervious plate 142, a fourth light-pervious plate 144, and a liquid crystal layer 146 sandwiched between the third light-pervious plate 142 and the fourth light-pervious plate 144.

The third light-pervious plate 142 is stacked on the surface of the first polarizer 130. An alignment layer 142A is formed on a surface of the third light-pervious plate 142 adjacent to the liquid crystal layer 146. The alignment layer 142A includes a large number of parallel grooves configured for aligning liquid crystal molecules adjacent to the alignment layer 142A. In this embodiment, the grooves of the alignment layer 142A are parallel with the polarization axis 130A.

An alignment layer 144A is formed on a surface of the fourth light-pervious plate 144 adjacent to the liquid crystal layer 146. The alignment layer 144A includes a large number of parallel grooves configured for aligning liquid crystal molecules adjacent to the alignment layer 142A. In this embodiment, the grooves of the alignment layer 144A intersect at right angles with that of the alignment layer 142A. The liquid crystal layer 146 can be a TN type liquid crystal layer. It is known that the TN type liquid crystal layer can cause a polarization direction of linearly polarized light to rotate 90°. The four light-pervious plates 142, 144, 120, and 122 can be made of the same materials, such as glass or plastic. Because the first liquid crystal cell 14 is stacked on a surface of the display panel 12, positions on the surface 1442 can correspond to positions on the surface of the display panel 12.

The image capture module 16 includes a lens barrel 162, a lens holder 164, optical lens group 166, a third polarizer 168, and an image sensor 170. In this embodiment, the optical lens group 166 includes two optical lenses. The optical lens group 166 and the third polarizer 168 are housed in the lens barrel 162. The lens barrel 162 is threadedly engaged in the lens holder 164. The image sensor 170 is installed in the lens holder 164. The optical lens group 166 is aligned with the image sensor 170. The third polarizer is arranged between the optical lens group 166 and the image sensor 170. In an alternative embodiment, the third polarizer 168 can also be arranged at a side of the lens group 166 facing away from the image sensor 170, between optical lenses of the optical lens group 166, or in the lens holder 164. In another alternative embodiment, the third polarizer 168 can also be replaced by a polarization film coated on one surface of the lenses of the lens group 166.

The image capture module 16 is positioned facing the fourth light-pervious plate 144 of the first liquid crystal cell 14. The optical lens group 166 is arranged facing a surface 1442 of the fourth light-pervious plate 144 such that a viewing field of the image capture module 16 can cover the entire surface 1442. The third polarizer 168 has a polarization axis 168A associated therewith parallel with the polarization axis 130A of the first polarizer 130. That is, the polarization axis 168A is parallel with the X axis.

Figure 3:
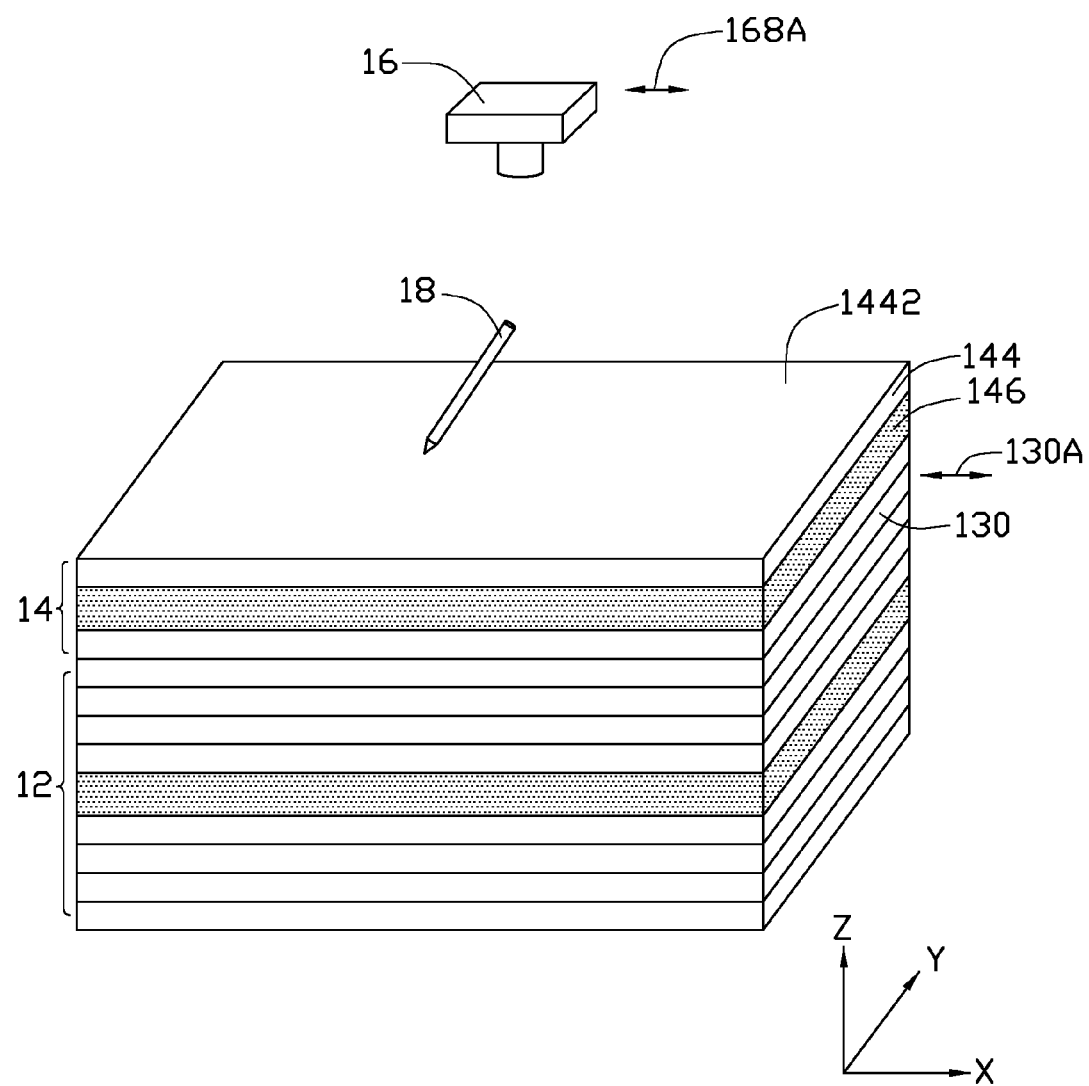
FIG. 3 is a schematic, isometric view of the optical touch screen device of FIG. 1 with a stylus pressing a surface thereof.
Figure 4:
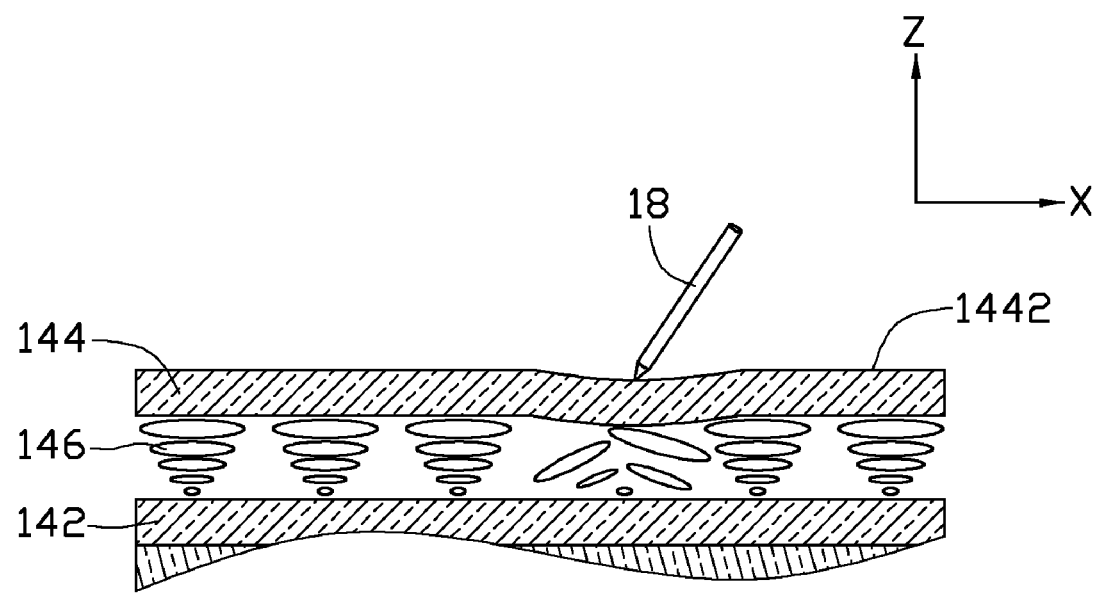
FIG. 4 shows changes of orientations of liquid-crystal molecules housed in the optical touch screen when the stylus presses the surface of the optical touch screen device in FIG. 3.

Referring to FIGS. 3 and 4, a process for realizing a touch control function using the optical touch screen device 100 is described as follows. Firstly, the viewing field of the image capture module 16 is adjusted such that the entire surface 1442 of the fourth light-pervious plate 144 is located in the viewing field of the image capture module 16. Then a coordinate position of the surface 1442 in the viewing of the image capture module 16 is calculated by a processing unit (not shown), for example coordinate positions of four points at four corners of the surface 1442 in the viewing field of the image capture module 16 are calculated. Then coordinate positions of the entire surface 1442 in the viewing of the image capture module 16 can be calculated based on the above four coordinate positions.

After transmitting through the first polarizer 130, light emitted from the backlight module 136 is linearly polarized with a polarization direction parallel with the X axis. The liquid crystal layer 146 causes the polarization direction of the linearly polarized light to rotate 90°. Thus, the light output from the surface 1442 is linearly polarized light with a polarization direction perpendicular to the X axis, i.e. perpendicular to the polarization axis 168A. Therefore, light output from the surface 1442 is blocked by the third polarizer 168 of the image capture module 16. Here the image capture module 170 cannot capture the light output from the surface 1442.

Secondly, an object, such as a stylus 18 presses the surface 1442 at one position with a certain force. The fourth light-pervious plate 144 is deformed by the stylus 18. One part of the liquid crystal layer 146 aligned with the position pressed by the stylus 18 is pushed by the fourth light-pervious plate 144, thereby the orientations of liquid-crystal molecules of the liquid crystal layer 146 are changed to be disorderly. Light transmitting through the disorderly liquid crystal molecules becomes non-linear polarized light. That is, a part of the light emitted from the position pressed by the stylus 18 has a polarization direction parallel with the polarization axis 168A of the third polarizer 168. Thus the part of light is transmitted through the third polarizer 168 and is sensed by the image sensor 170. Therefore, the light output from the position on the surface 1442 pressed by the stylus 18 is captured by the image capture module 16. Then the image capture module 16 analyzes/detects a coordinate position of the stylus 18 based on position of the light in the image captured by the image capture module 16. Finally, an instruction is executed based on the coordinate position of the stylus 18.

The display panel 12 can also be other types, such as a light emitting diode (LED) display panel and a field emission display panel. In this case, a polarizer with polarization axis parallel with the polarization axis 168A must be arranged on a surface of each of the two types of display panel.

In this embodiment, the optical touch screen device 100 only includes a first liquid crystal cell 14 arranged on the surface of the display panel 12, and an image capture module 16 at one side of the display panel 12. Resistors/capacitors with a complex manufacture procedure can be omitted, thus reducing cost and increasing production efficiency.

Figure 5:
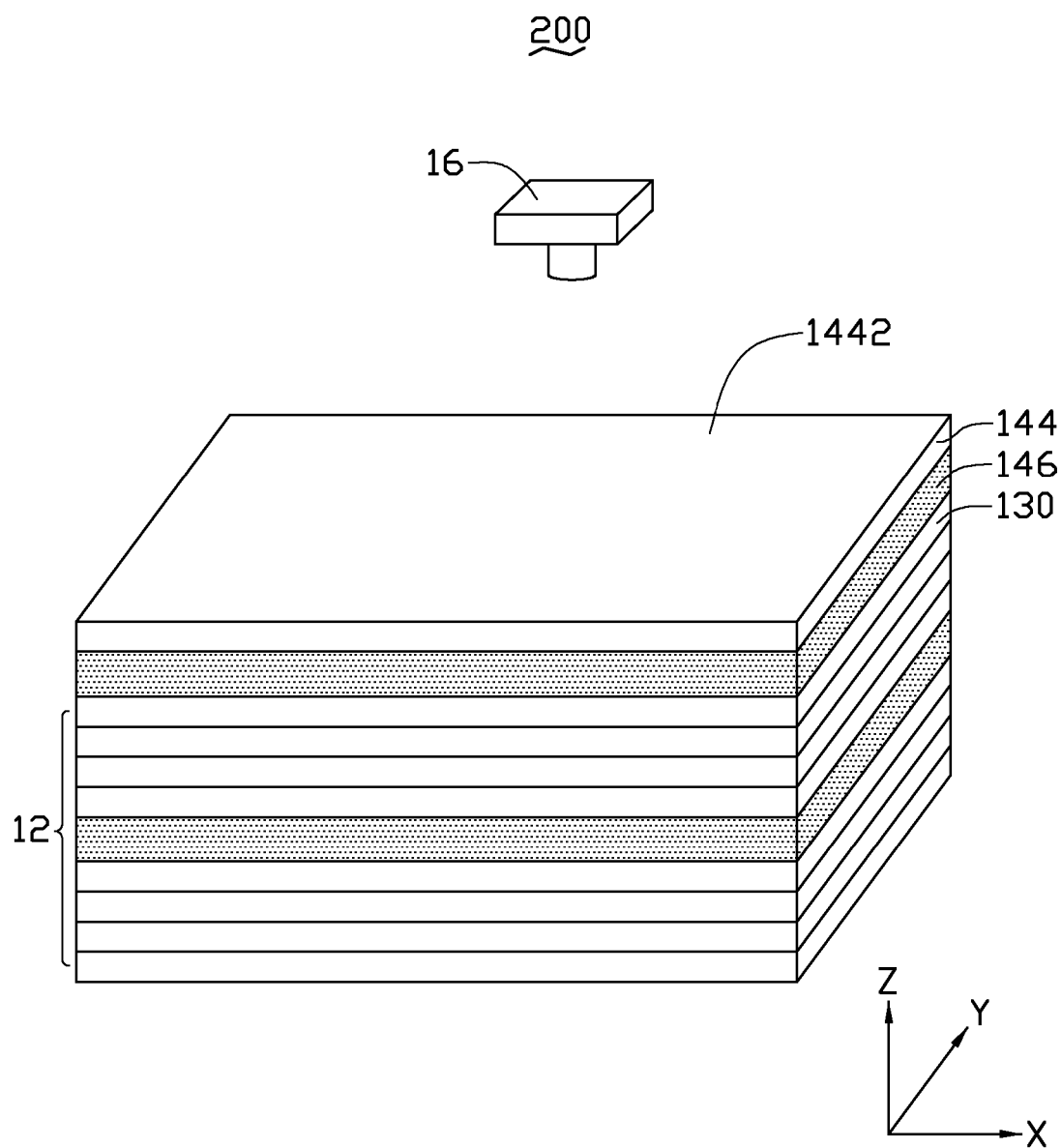
FIG. 5 is a schematic, isometric view of an optical touch screen device in accordance with a second exemplary embodiment.

Referring to FIG. 5, an optical touch screen device 200 in accordance with a second exemplary embodiment is provided. The optical touch screen device 200 differs from the optical touch device 100 in that the third light-pervious plate 142 of the first embodiment is omitted. The alignment layer 142A (as shown in FIG. 1) formed on the third light-pervious plate 142 is formed on a surface of the first polarizer 130 adjacent to the liquid crystal layer fourth light-pervious plate 144. The liquid crystal layer 146 is arranged between the first polarizer 130 and the fourth light-pervious plate 144. A process for realizing a touch control function using the optical touch screen device 200 is similar to that of the first embodiment.

Figure 6:
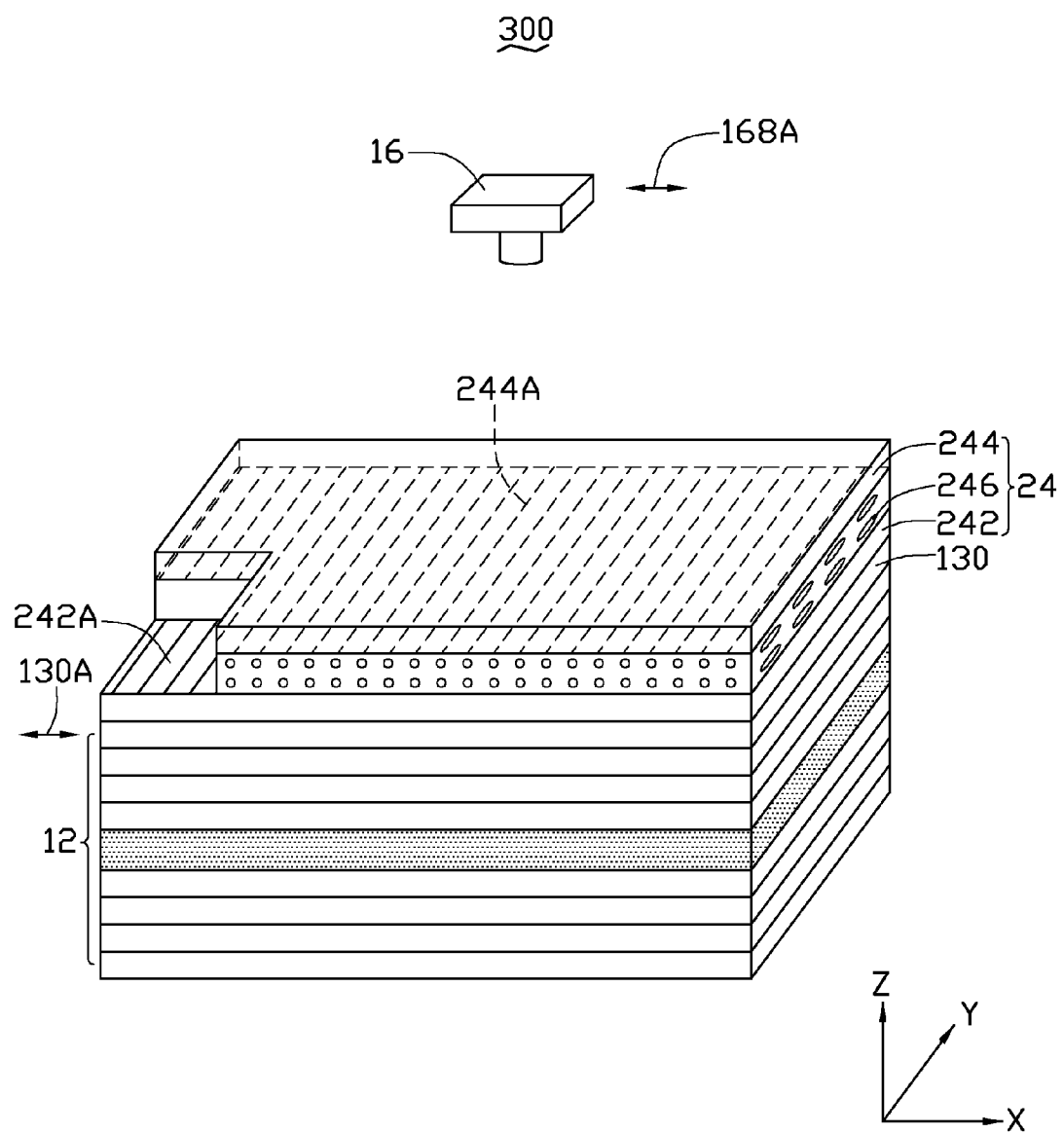
FIG. 6 is a schematic, isometric view of an optical touch screen device in accordance with a third exemplary embodiment.

Referring to FIG. 6, an optical touch screen device 300 in accordance with a third exemplary embodiment is provided. The optical touch screen device 300 differs from the touch control device 100 in that the optical control device 300 includes a second liquid crystal cell 24 to replace the first liquid crystal cell 14 of the first exemplary embodiment.

The second liquid crystal cell 24 includes a fifth light-pervious plate 242, a sixth light-pervious plate 244, and a liquid crystal layer 246 sandwiched between the fifth light-pervious plate 242 and the sixth light-pervious plate 244. The fifth light-pervious plate 242 is stacked on a surface of the first polarizer 130. The sixth light-pervious plate 244 faces the image capture module 16. In this embodiment, orientations of liquid crystal molecules of the liquid crystal layer 246 are substantially parallel with the fifth and sixth light-pervious plates 242 and 244. In addition, orientations of liquid crystal molecules of the liquid crystal layer 246 are substantially perpendicular to the polarization axis 130A of the first polarizer 130. The orientations of liquid crystal molecules can be realized by forming an alignment film 242A on the fifth light-pervious plate 242 and forming an alignment film 244A on the sixth light-pervious plate 244. The alignment films 242A and 244A each have an orientation perpendicular to the polarization axis 130A of the first polarizer 130.

It is known that the liquid crystal layer 146 is equivalent to a uniaxial birefringence crystal with its principal axis parallel with the orientations of the liquid crystal molecules. The uniaxial birefringence crystal can change linearly polarized light transmitting therethrough into elliptically polarized light. Linearly polarized light output from the first polarizer 130 is transmitted through the second liquid crystal cell 24. The linearly polarized light is changed to elliptically polarized light after transmission through the liquid crystal layer 246. The elliptically polarized light has a long axis and a short axis perpendicular to the long axis. The long axis is perpendicular to the polarization axis 130A of the first polarizer 130. The long axis is more than three times longer than the short axis such that the elliptically polarized light is approximates linearly polarized light perpendicular to the polarization axis 130A. A process for realizing a touch control function using the optical touch screen device 300 is similar to that of the first embodiment.

Figure 7:
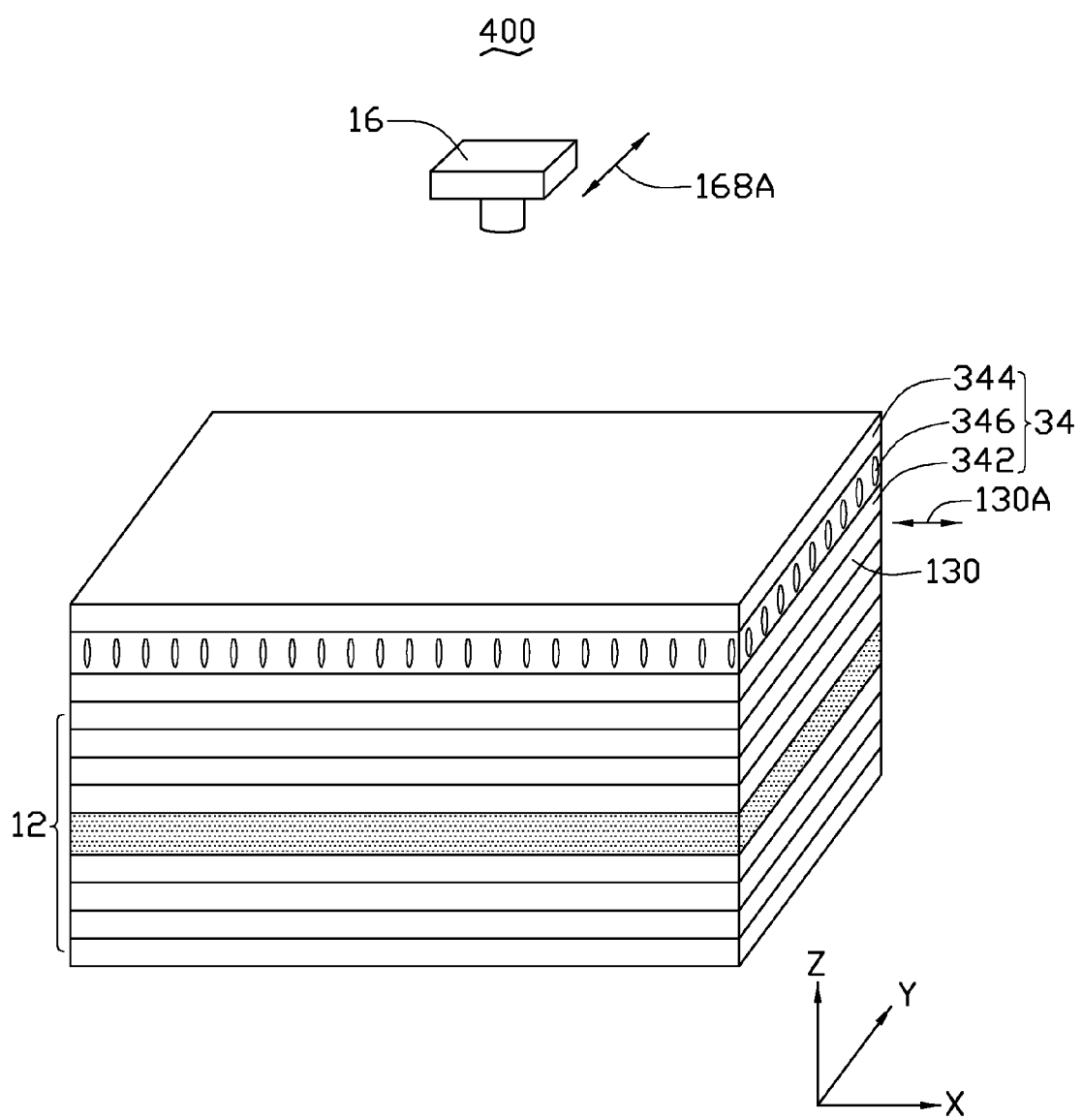
FIG. 7 is a schematic, isometric view of an optical touch screen device in accordance with a fourth exemplary embodiment.

Referring to FIG. 7, an optical touch screen device 400 in accordance with a fourth exemplary embodiment is provided. The optical touch screen device 400 differs from the optical touch screen device 100 in that the optical touch screen device 400 includes a third liquid crystal cell 34 to replace the first liquid crystal cell 14 and the polarization axis 168A of the third polarizer 168 is perpendicular to the polarization axis 130A of the first polarizer 130.

The third liquid crystal cell 34 includes a seventh light-pervious plate 342, an eighth light-pervious plate 344 and a liquid crystal layer 346 sandwiched between the seventh light-pervious plate 344 and eighth light-pervious plate 342. The seventh light-pervious plate 342 is stacked on a surface of the first polarizer 130. The eighth light-pervious plate 344 faces the image capture module 16. Orientations of liquid crystal molecules of the liquid crystal layer 346 are substantially perpendicular to the seventh and eighth light-pervious plates 342 and 344. In this embodiment, the light transmits through the liquid crystal layer 346 in a direction substantially parallel with the orientation of the liquid crystal molecules of the liquid crystal layer 346. Thus, an orientation of the polarization direction of the light is unchanged. That is, a polarization direction of the light output from the eighth light-pervious plate 344 is perpendicular to the polarization axis 168A of the third polarizer 168. Thus the light output from the eighth light-pervious plate 344 is blocked by the third polarizer 168. When an object presses the eighth light-pervious plate 344, the orientations of liquid-crystal molecules of the liquid crystal layer 346 is changed to be disorderly. Light transmitting through the disorderly liquid crystal molecules becomes non-linear polarization light. Thus, a part of light is transmitted through the third polarizer 168 and then is sensed by the image sensor 170 (see FIG. 2). A process for realizing a touch control function using the optical touch screen device 400 is similar to that of the first embodiment.

In an alternative embodiment, the liquid crystal cell in the first to fourth embodiments can be replaced by a super-twisted-nematic-type (STN-type) liquid crystal cell.

Figure 8:
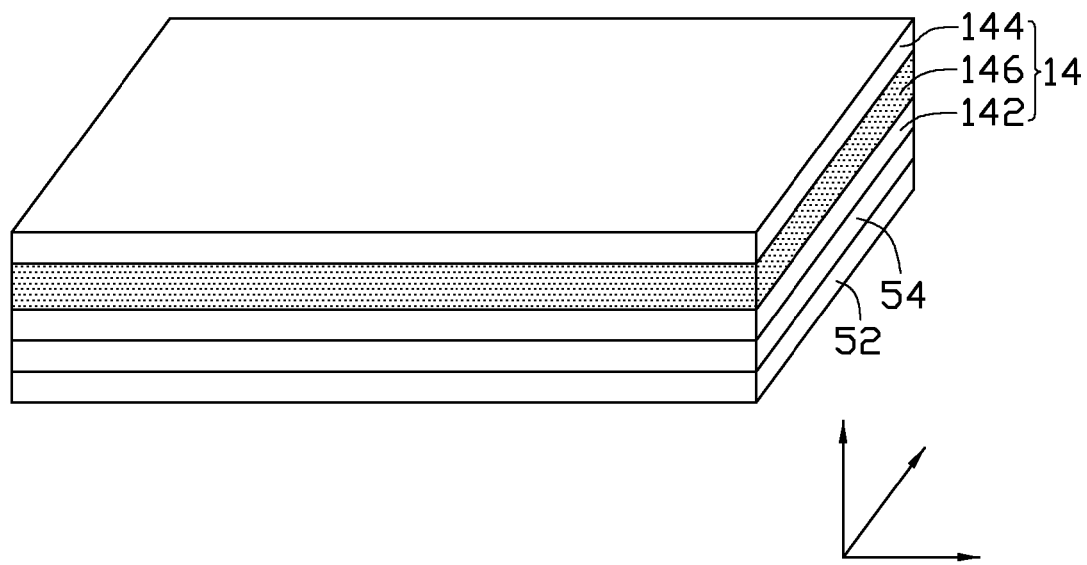
FIG. 8 is a schematic, isometric view of a hand-writing device in accordance with a fifth exemplary embodiment.

Referring to FIG. 8, a hand-writing device 500 in accordance with a fifth exemplary embodiment includes a surface light source 52, a fourth polarizer 54, a liquid crystal cell 14, and an image capture module 16. The surface light source 52, the fourth polarizer 54, and the liquid crystal cell 14 are stacked one after another in the written order. The liquid crystal cell 14 and image capture module 16 are described in the first exemplary embodiment. The image capture module 16 is arranged facing the fourth polarizer 54. A polarization axis of the fourth polarizer 54 is parallel with the polarization axis 168A of (see FIG. 1) of the third polarizer 168 (see FIG. 2).

In this embodiment, the image capture module 16 is configured for continuously capturing images at a certain at a certain number of images per unit time such as 40 per second so that path of a sliding touch can be determined. As described in the first exemplary embodiment, the image capture module 16 can analyze/detect a coordinate position of an object pressed on the fourth light-pervious plate 144. When an object touches and moves on a surface of the fourth light-pervious plate 144 of the liquid crystal cell 14, the image capture module 16 continuously analyzes/detects positions of the object. Thus a movement track of the object moving on the fourth light-pervious plate 144 is recorded.

In an alternative embodiment, the light-pervious plate 142 of this embodiment can be omitted. In that case, the alignment layer 142A (as shown in FIG. 1) formed on the third light-pervious plate 142 can be formed on a surface of the fourth polarizer 54 adjacent to the liquid crystal layer 146. In another alternative embodiment, the liquid crystal cell 14 of this embodiment can be replaced by the liquid crystal cells 24 of the third exemplary embodiment, the liquid crystal cells 34 of the fourth exemplary embodiment, or a STN-type liquid crystal cell.

Figure 9:
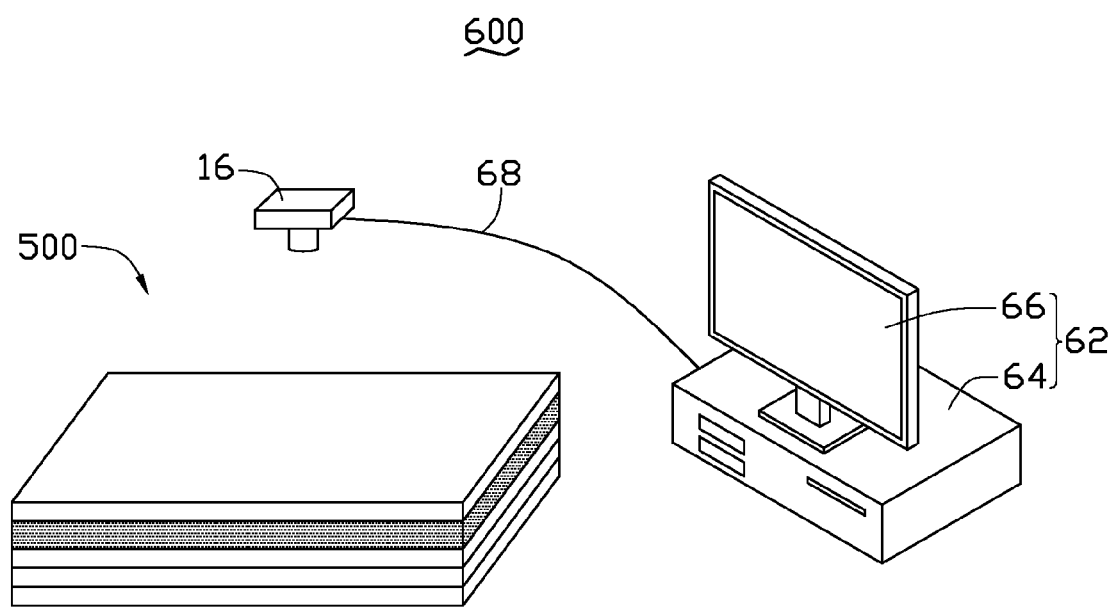
FIG. 9 is a schematic, isometric view of a hand-writing system in accordance with a sixth exemplary embodiment.

Referring to FIG. 9, a hand-writing system 600 in accordance with a sixth exemplary embodiment includes a hand-writing device 500 and a output device 62. The output device 62 includes a processing device 64 and a display screen 66 electrically connected to the processing device 64. The image capture module 16 is electrically connected to the processing device 64 via a data wire 68. The processing device 64 is configured for determining a movement track of an object which presses the first light-pervious plate. The display screen 66 is configured for displaying the movement track of an object moving on the fourth light-pervious plate 144 (see FIG. 8).

Finally, it is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. An optical touch screen device comprising:
a light output panel comprising a first surface for outputting light rays;
a first polarizer stacked on the first surface, the first polarizer having a first polarization axis associated therewith;
a first light-pervious plate facing the first polarizer;
a first liquid crystal layer arranged between the first polarizer and the first light-pervious plate, the first liquid crystal layer comprising a plurality of liquid crystal molecules aligned in predetermined orientations; and
an image capture module facing the first light-pervious plate and having a viewing field covering an entire surface of the first light-pervious plate, the image capture module comprising a second polarizer, the second polarizer having a second polarization axis associated therewith; and the first liquid crystal layer configured for causing light transmitting therethrough to have a polarization direction perpendicular to the second polarization axis.

2. The optical touch screen device of claim 1, wherein the first liquid crystal layer is a twisted nematic-type or super twisted nematic-type, and the first polarization axis of the first polarizer is parallel with the second polarization axis of the second polarizer.

3. The optical touch screen device of claim 1, wherein the orientations of the liquid crystal molecules are arranged substantially parallel with the first surface and are perpendicular to the first polarization axis, and the first polarization axis is parallel with the second polarization axis.

4. The optical touch screen device of claim 1, wherein the orientations of the liquid crystal molecules are arranged substantially perpendicular to the first surface, and the first polarization axis is perpendicular to the second polarization axis.

5. The optical touch screen device of claim 1, further comprising a second light-pervious plate arranged between the first polarizer and the first liquid crystal layer, wherein alignment films are formed on surfaces of the first and second light-pervious plates adjacent to the first liquid crystal layer for aligning the liquid crystal molecules in the predetermined orientations.

6. The optical touch screen device of claim 1, wherein the light output panel is one of a light emitting diode display panel and a field emission display panel.

7. The optical touch screen device of claim 1, wherein the light output panel and the first polarizer cooperatively form a liquid crystal display panel.

8. The optical touch screen device of claim 7, wherein the liquid crystal display panel is selected from the group consisting of a reflection type, a transmission type and a transflective type.

9. The optical touch screen device of claim 1, wherein the light output panel is a surface light source for emitting polarized light.

10. A hand-writing system, comprising:
an optical touch screen device, comprising:
a surface light source comprising a light output surface for outputting light rays,
a first polarizer stacked on the light output surface, the first polarizer having a first polarization axis associated therewith,
a first light-pervious plate facing the first polarizer,
a liquid crystal layer arranged between the first polarizer and the first light-pervious plate, the liquid crystal layer comprising a plurality of liquid crystal molecules aligned in predetermined orientations, and
an image capture module having a viewing field covering an entire surface of the first light-pervious plate, the image capture module comprising a second polarizer, the second polarizer having a second polarization axis associated therewith, and the liquid crystal layer configured for causing light transmitting therethrough to have a polarization direction perpendicular to the second polarization axis; and
a processing device for determining a movement track of an object which presses the first light-pervious plate.

11. The hand-writing system of claim 10, wherein liquid crystal layer is one of a twisted nematic-type and super twisted nematic-type, and the first polarization axis of the first polarizer is parallel with the second polarization axis of the second polarizer.

12. The hand-writing system of claim 10, wherein the orientations of the liquid crystal molecules are arranged substantially parallel with the first surface and are perpendicular to the first polarization axis, and the first polarization axis is parallel with the second polarization axis.

13. The hand-writing system of claim 10, wherein the orientations of the liquid crystal molecules are arranged substantially perpendicular to the first surface, and the first polarization axis is perpendicular to the second polarization axis.

14. The hand-writing system of claim 10, wherein the optical touch screen device further comprises a second light-pervious plate arranged between the first polarizer and the liquid crystal layer, and alignment films are formed on surfaces of the first and second light-pervious plates adjacent to the liquid crystal layer for aligning the liquid crystal molecules in the predetermined orientations.

15. The optical touch screen device of claim 7, wherein the light output panel comprises a third light-pervious plate, a fourth light-pervious plate, a first electrode, a second electrode, a second liquid crystal layer and a third polarizer, the first and second electrode layers being positioned between the third and fourth light-pervious plates, the second liquid crystal layer being sandwiched between the first and second electrode layers, the third light-pervious plate being adjacent to the first polarizer, the third polarizer being adjacent to the fourth light-pervious plate facing away from the second electrode layer.

16. The optical touch screen device of claim 15, wherein the light output panel further comprises a backlight module adjacent to the third polarizer facing away from the fourth light-pervious plate.

* * * * *